Sept. 12, 1950     H. A. PALMER     2,522,397
BAKING UTENSIL
Filed June 18, 1947     2 Sheets-Sheet 1
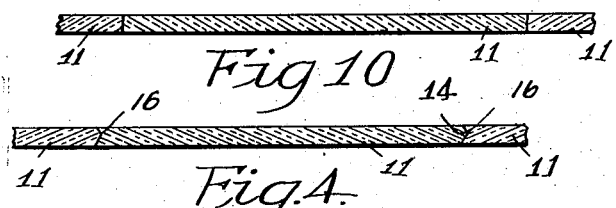
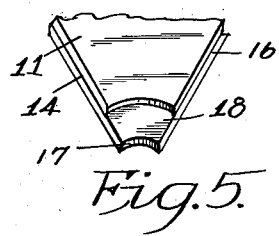
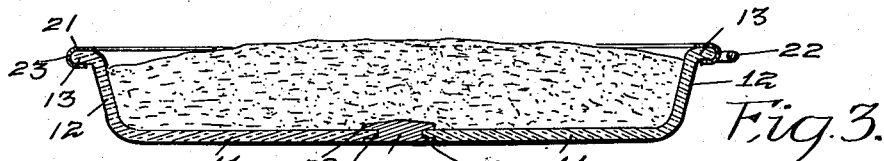
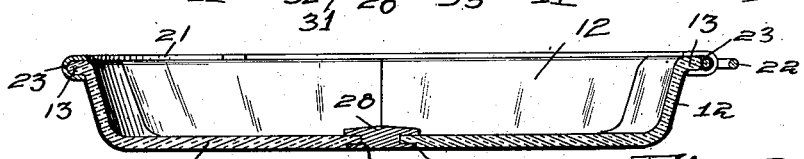
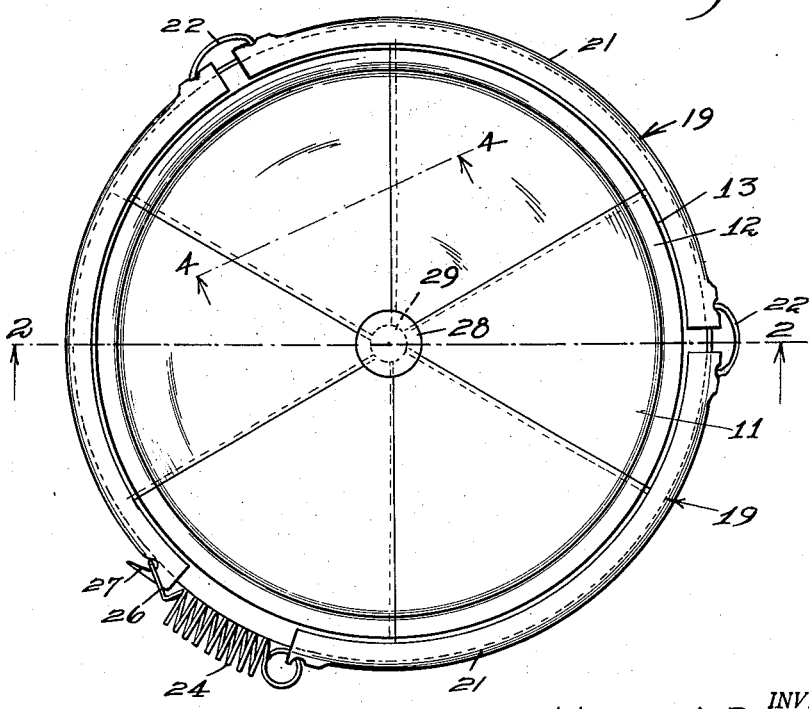
INVENTOR.
HELEN A. PALMER
BY
Alfred G. Hague
Atty Sept. 12, 1950 — H. A. PALMER — 2,522,397
BAKING UTENSIL
Filed June 18, 1947 — 2 Sheets-Sheet 2
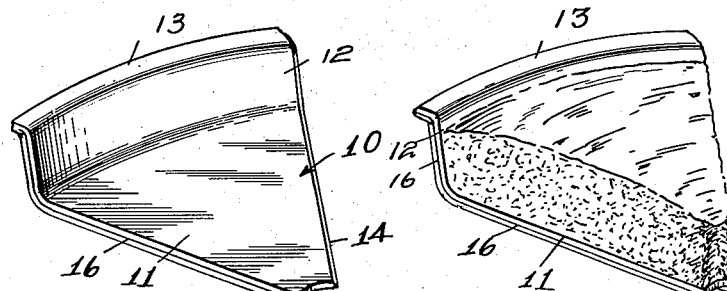
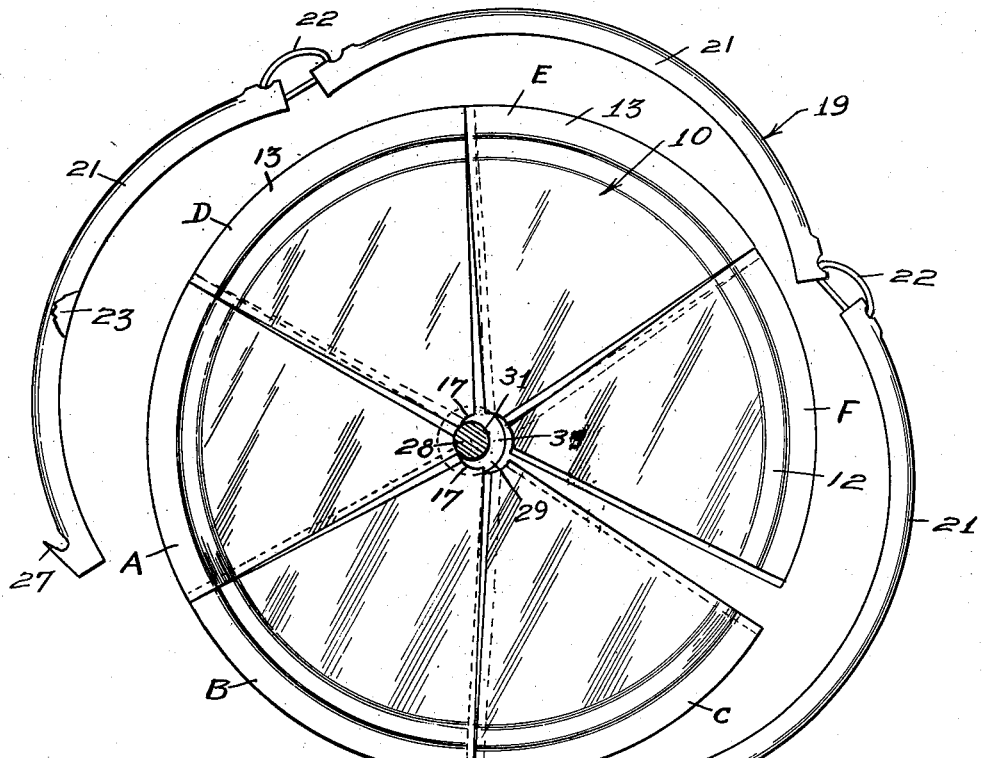
INVENTOR.
HELEN A. PALMER Patented Sept. 12, 1950

2,522,397

UNITED STATES PATENT OFFICE 2,522,397

BAKING UTENSIL

Helen A. Palmer, Des Moines, Iowa

Application June 18, 1947, Serial No. 755,319

2 Claims. (Cl. 220—4)

This invention relates to an improved baking utensil and is designed to be used in the baking of a dessert to be served to patients of sanatoriums or hospitals wherein the eating of pie is prohibited due to the indigestibility of the crust. I find usually these patients often insist on being served pie. I also find that in a majority of cases a custard or pie filler of certain kinds may be substituted if served in the form of a piece of pie.

This invention relates more specifically to an improved baking utensil comprising a plurality of separable segmental sections with means for binding all of the sections together to form a unitary juice tight receptacle.

The object of my invention is to provide a baking utensil so constructed and arranged that the filler of a pie or a custard may be baked without paste and when so baked served as having the general appearance of a serving of pie.

A further object of my invention is to provide a baking utensil formed of segmental sections adapted to be placed and joined together in a separable manner to form a juice tight pan or receptacle adapted to receive a pie filler or custard to be baked, and after baking capable of being cut on the adjoining edges of the sections, and after being cut separated and served in the individual section in which it was baked.

My invention consists in the construction, arrangement and combination of the various parts of the device whereby the objects contemplated and attained as hereinafter more fully set forth, pointed out in my claims and illustrated in the accompanying drawings, in which:

Figure 1 is a plan view of my improved baking receptacle assembled ready to receive a filler to be baked.

Figure 2 is a sectional view taken on the line 2—2 of Figure 1.

Figure 3 is a similar view of the utensil with a filler therein.

Figure 4 is an enlarged sectional view taken on the line 4—4 of Figure 1.

Figure 5 is an inverted perspective view of the inner end of one of the segmental sections.

Figure 6 is a plan view of the utensil partly assembled.

Figure 7 is a perspective view of one of the segmental sections.

Figure 8 is a perspective view of one of the individual sections with a baked filler thereon ready to be served as a dessert.

Figure 9 is a side elevation of the center core.

Figure 10 is an enlarged detail sectional view taken on the line 4—4 of Figure 1 of slightly modified form.

My improved baking utensil comprises a plurality of segmental sections 10 formed preferably of glass or a ceramic material. However, stainless steel or tin may be used. Each section comprises a bottom 11, an arcuate wall 12 and a lateral flange 13. The side edges of said sections are radial to a common center and adapted to be joined together to form a complete circular baking utensil. One of the edges is formed with a tongue 14 and the other with a groove 16. Each side has a truncated end 17. The under side of the inner end of the section 11 is provided with a rabbet 18.

The sections 11 are adapted to be assembled to form a unitary receptacle as illustrated in Figure 1 with the tongue 14 of one section positioned in the groove 16 of an adjoining section. These grooves and tongues extend from the top of the wall 12 to the inner end 17 of the bottom 11 and serve to prevent leakage of juices from within the receptacle and also to assist in preventing up and down movement of one section relative to the other.

In order to easily and quickly bind all of the sections together and also permit them to be easily separated after the filler has been baked, I have provided what I shall term an annulation 19, formed preferably of three arcuate sections 21, secured together end to end by links 12. The inner edge of each member 22 is provided with a groove 23 for receiving the flanges 13 of the sections 11 after the said sections have been assembled.

One of the end members 21 is provided with a spring 24 having a loop portion 26 adapted to engage a hook 27 formed on the free end of the other end member 21, serving to yieldably bind all of the sections 11 together. A core 28 is provided for closing the opening 29 formed by truncating the inner ends of the bottom members 11. The core 28 is provided with an annular groove 31, forming upper and lower flanges 32 and 33.

In the assembling of the utensil the individual sections 10 are arranged in a manner illustrated in Figure 6 which is accomplished by first placing the core 28 on the table after which section A is placed in position with its truncated end 17 inserted in the annular groove 31. Section B is then placed in position with the grooved and tongue portions of the wall 12 in contact, and the inner ends somewhat separated. In a like manner the other sections C, D, E and F are placed in position. The periphery of the assembly is then contracted causing the gap between sections C and F to be closed and the ends 17 to be positioned in the groove 31 with the flange 33 in the rabbets 18.

The annulation 19 is then placed in position by placing the center section 21 over the flanges 13 of sections D, E and F. The end sections 21 are then moved to position on the corresponding flanges of the sections B and C. The loop 26 of the spring 24 is then placed over the hook portion 27. The tension of the spring yieldably forces all of the tongued and grooved edges tightly together with the end 17 firmly in the groove 33 of the core 28. The utensil is then ready for use. A custard or pie filler may then be placed in the utensil and baked after which it may be cut by placing the pointed end of the knife opposite one of the joints between the flange section, then moving it toward the diametrically opposite joint. In this manner the incision of the filler is located above the joined edges of the bottom portions, an incision being made above each of the joined edges of said sections. The annulation may then be removed, after which the sections may be separated with its individual baked filler thereon as illustrated in Figure 8. The filler is served on the section and without the objectionable crust in the serving of pie.

The sections 10 might be formed with square edges without the tongue and groove, as illustrated in Figure 10 providing a somewhat cheaper construction, if so desired.

It will thus be seen that I have provided a baking utensil of simple durable and inexpensive construction and so arranged that a pie filler may be baked without having to provide a crust.

I claim:

1. A baking utensil comprising a plurality of segmental bottom plates each having its edges radiating from a common center and a circumferential edge terminating in an upright arcuate wall, having at its top edge an outwardly projecting flange, a flexible member for engaging said flanges and binding all of said segmental sections together to form a unitary juice tight pan, said flexible member comprising a plurality of arcuate sections, having their adjacent ends linked together, the inner edge of each arcuate section formed in a groove, one of the free ends of said flexible member terminating in a hook and the other provided with one end of a spring whereby the radial edges and the arcuate walls of said segmental section may be bound together by applying the grooves of said flexible member to the flanges of said upright walls with the free end of said spring applied to said hook.

2. A baking utensil comprising a plurality of segmental bottom plates each having its edges radiating from a common center and a circumferential edge terminating in an upright arcuate wall having at its top edge an outwardly projecting flange, a flexible member for engaging said flanges and binding all of said segmental sections together to form a unitary juice tight pan, said flexible member comprising a plurality of arcuate sections, having their adjacent ends linked together, the inner edge of each arcuate section formed in a groove, one of the free ends of said flexible member terminating in a hook and the other provided with one end of a spring, the angular length of each arcuate section being greater than the angular length of said flanges, whereby the radial edges and the arcuate walls of said segmental section may be bound together by applying the grooves of said flexible member to the flanges of said upright walls with the free end of said spring applied to said hook.

HELEN A. PALMER.

REFERENCES CITED

The following references are of record in the file of this patent:

UNITED STATES PATENTS

| Number | Name | Date |
| --- | --- | --- |
| 773,814 | Shotts | Nov. 1, 1904 |
| 1,277,253 | Paschal | Aug. 27, 1918 |
| 1,526,397 | Thornton | Feb. 17, 1925 |
| 1,647,186 | Miles | Nov. 1, 1927 |
| 1,740,957 | Phillips | Dec. 24, 1929 |
| 1,894,280 | Nelson | Jan. 17, 1933 |